United States Patent
Thorman (10) Patent No.: US 7,078,468 B2
(45) Date of Patent: Jul. 18, 2006

(54) POLYMERIZATION CATALYST SYSTEM USING DI-SEC-BUTYLDIMETHOXYSILANE FOR PREPARATION OF POLYPROPYLENE

(75) Inventor: Joseph Thorman, League City, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/724,925

(22) Filed: Dec. 1, 2003

(65) Prior Publication Data

US 2004/0266962 A1    Dec. 30, 2004

Related U.S. Application Data

(60) Provisional application No. 60/483,215, filed on Jun. 27, 2003.

(51) Int. Cl.
*C08F 4/42* (2006.01)

(52) U.S. Cl. ............ 526/124.3; 526/351; 526/124.2; 526/124.1; 502/103; 502/116

(58) Field of Classification Search .......... 526/351, 526/103, 124.3, 124.2, 124.1; 502/103, 116
See application file for complete search history.

(56) References Cited

U.S. PATENT DOCUMENTS

| | | | |
|---|---|---|---|
| 4,107,413 A | 8/1978 | Giannini et al. |
| 4,115,319 A | 9/1978 | Scata et al. |
| 4,218,339 A | 8/1980 | Zucchini et al. |
| 4,220,554 A | 9/1980 | Scata et al. |
| 4,294,721 A | 10/1981 | Cecchin et al. |
| 4,298,718 A | 11/1981 | Mayr et al. |
| 4,328,122 A | 5/1982 | Monte et al. |
| 4,395,360 A | 7/1983 | Albizatti et al. |
| 4,439,540 A | 3/1984 | Cecchin et al. |
| 4,460,701 A | 7/1984 | Terano et al. |
| 4,473,660 A | 9/1984 | Albizzati et al. |
| 4,544,717 A | 10/1985 | Mayr et al. |

(Continued)

FOREIGN PATENT DOCUMENTS

EP    0 565 173 A1    10/1993

(Continued)

OTHER PUBLICATIONS

A. Proto, et al., "Isotactic-Specific Polymerization of Propene with Supported Catalysts in the Presence of Different Modifiers," Macromolecules, 1990, pp. 2904-2907, 23:11.

(Continued)

*Primary Examiner*—Ling-Sui Choi
(74) *Attorney, Agent, or Firm*—Tenley R. Krueger (57) ABSTRACT

It has been discovered that using di-sec-butyldialkoxysilanes, such as di-sec-butyldimethoxysilane (DSBDMS), as external electron donors for Ziegler-Natta catalysts can provide a catalyst system that may prepare polypropylene films with improved properties and processing. The catalyst systems of the invention provide high activity, high bulk density, moderate hydrogen response, moderate donor response and high polydispersity (MWD). Suitable di-sec-butyldialkoxysilanes have the formula $(^sBu)_2Si(OR")_2$, where R" is independently a straight or branched alkyl group of 1–5 carbon atoms.

17 Claims, 4 Drawing Sheets

U.S. PATENT DOCUMENTS

| | | |
|---|---|---|
| 4,562,173 A | 12/1985 | Terano et al. |
| 4,927,797 A | 5/1990 | Ewen |
| 4,971,937 A | 11/1990 | Albizzati et al. |
| 5,106,807 A | 4/1992 | Morini et al. |
| 5,489,634 A * | 2/1996 | Hara et al. ............... 526/119 |
| 5,891,817 A | 4/1999 | Shamshoum et al. |
| 5,945,366 A | 8/1999 | Kataoka et al. |
| 6,133,385 A | 10/2000 | Shamshoum |
| 6,255,247 B1 | 7/2001 | Shamshoum et al. |
| 6,323,293 B1 | 11/2001 | Shamshoum et al. |

FOREIGN PATENT DOCUMENTS

EP  0 565 173 B1  10/1993

OTHER PUBLICATIONS

NERAC Abstract of EP 576,413 A1, Dec. 29, 1993.
NERAC Abstract of EP 658577 B1, Jul. 16, 1997.

\* cited by examiner

FIG. 4

Donor response at various hydrogen and donor levels

POLYMERIZATION CATALYST SYSTEM USING DI-SEC-BUTYLDIMETHOXYSILANE FOR PREPARATION OF POLYPROPYLENE

CROSS-REFERENCE TO RELATED APPLICATION

This application claims the benefit of U.S. provisional application 60/483,215 filed Jun. 27, 2003.

FIELD OF THE INVENTION

The present invention relates to polymerization catalyst systems and processes for the preparation of polypropylene, and more particularly relates, in one embodiment, to polymerization catalyst systems for and controlled polymerization processes for the preparation of polypropylene that gives improvement in physical properties.

BACKGROUND OF THE INVENTION

Thermoplastic olefin polymers, such as linear polyethylene, polypropylene, and olefin copolymers, are formed in polymerization reactions where a monomer is introduced into a reactor with an appropriate catalyst to produce the olefin homopolymer or copolymer. The polymer is withdrawn from the catalyst reactor and may be subjected to appropriate processing steps and then extruded as a thermoplastic mass through an extruder and die mechanism to produce the polymer as a raw material in particulate form, usually as pellets or granules. The polymer particles are ultimately heated and processed in the formation of the desired end products.

Polypropylene manufacturing processes typically involve the polymerization of propylene monomer with an organometallic catalyst of the Ziegler-Natta type. The Ziegler-Natta type catalyst polymerizes the propylene monomer to produce predominantly solid crystalline polypropylene. Polypropylene is most often produced as a stereospecific polymer. Many desirable product properties, such as strength and durability, depend on the crystallinity of the polypropylene that in turn is dependent on the stereospecific arrangement of methyl groups on the polymer backbone.

Stereospecific polymers are polymers that have a defined arrangement of molecules in space. Both isotactic and syndiotactic propylene polymers, for example, are stereospecific. The isotactic structure is typically described as having the methyl groups attached to the tertiary carbon atoms of successive monomeric units on the same side of a hypothetical plane through the main chain of the polymer, e.g., the methyl groups are all above or all below the plane.

This structure provides a highly crystalline polymer molecule. Using the Fisher projection formula, the stereochemical sequence of isotactic polypropylene may be shown as follows:

Another way of describing the structure is through the use of NMR spectroscopy. Bovey's NMR nomenclature for an isotactic pentad is mmmm with each "m" representing a "meso" dyad or successive methyl groups on the same side in the plane. As known in the art, any deviation or inversion in the structure of the chain lowers the degree of isotacticity and crystallinity of the polymer.

This crystallinity distinguishes isotactic polymers from an amorphous or atactic polymer, which is more soluble in an aromatic solvent such as xylene. Atactic polymer exhibits no regular order of repeating unit configurations in the polymer chain and forms essentially a waxy product. That is, the methyl groups in atactic polypropylene are randomly positioned. While it is possible for a catalyst to produce both amorphous and crystalline fractions, it is generally desirable for a catalyst to produce predominantly crystalline polymer with very little amorphous atactic polymer.

Catalyst systems for the polymerization of olefins are well known in the art. Typically, these systems include a Ziegler-Natta type polymerization catalyst; a co-catalyst, usually an organoaluminum compound; and an external electron donor compound or selectivity control agent, usually an organosilicon compound. There are a number of publications relating to catalysts and catalyst systems designed primarily for the polymerization of propylene and ethylene.

Ziegler-Natta catalysts for the polymerization of isotactic polyolefins are well known in the art. The Ziegler-Natta catalysts are stereospecific complexes derived from a halide of a transition metal, such as titanium, chromium or vanadium with a metal hydride and/or metal alkyl, typically an organoaluminum compound as a co-catalyst. The catalyst is usually comprised of a titanium halide supported on a magnesium compound. Ziegler-Natta catalysts, such as titanium tetrachloride ($TiCl_4$) supported on an active magnesium dihalide, such as magnesium dichloride or magnesium dibromide, are supported catalysts. Silica may also be used as a support. The supported catalyst may be employed in conjunction with a co-catalyst such as an alkylaluminum compound, for example, triethyl aluminum (TEAL), trimethyl aluminum (TMA) and triisobutyl aluminum (TIBAL).

The development of these polymerization catalysts has advanced in generations of catalysts. The catalysts currently used are considered by most to be third or fourth generation catalysts. With each new generation of catalysts, the catalyst properties have improved, particularly the efficiencies of the catalysts, as expressed in kilograms of polymer product per gram of catalyst over a particular time.

In the utilization of a Ziegler-Natta catalyst for the polymerization of propylene, it is generally desirable to add an external donor. External donors act as stereoselective control agents to control the amount of atactic or non-stereoregular polymer produced during the reaction, thus reducing the amount of xylene solubles. Examples of external donors include organosilicon compounds such as cyclohexylmethyldimethoxysilane (CMDS), dicyclopentyldimethoxysilane (CPDS) and diisopropyldimethoxysilane (DIDS). External donors, however, tend to reduce catalyst activity and tend to reduce the melt flow of the resulting polymer.

In addition to the improved catalysts, improved activation methods have also lead to increases in the catalyst efficiency. For example, one discovery involved a process for pre-polymerizing the catalyst just prior to introducing the catalyst into the reaction zone.

It is generally possible to control catalyst productivity (i.e., lbs. of polypropylene/lb. catalyst or other weight ratios) and product isotacticity within limits by adjusting the molar feed ratio of co-catalyst to external electron donor (and their corresponding ratios to the active metal content, e.g., titanium, in the Ziegler-Natta catalyst). Increasing the amount of external electron donor decreases the xylene solubles but may reduce activity and hence catalyst productivity. The xylene solubles (XS) content of the polypropylene product is a measure of the degree of stereoselectivity. Further, the polymer stereoregularity may be obtained by directly measuring the microtacticity of the product via $^{13}$C Nuclear Magnetic Resonance spectroscopy. The crystalline fraction used for this analysis is the XIHI (xylene insoluble, heptane insoluble) fraction.

Selectivity to isotactic polypropylene is typically determined under the XS test by measuring the amount of polypropylene materials that are xylene soluble. The xylene-solubles were measured by dissolving polymer in hot xylene, cooling the solution to 0° C. and precipitating out the crystalline material. The xylene solubles are the wt. % of the polymer that was soluble in the cold xylene.

In particular with respect to film grade polyolefin resins for biaxially oriented polypropylene (BOPP) applications, there is continuing interest in identifying catalyst systems that offer potential improvements in polymer physical properties and processability. Some previous studies have focused on efforts to enhance resin processability/extrusion characteristics via broadening of polymer molecular weight distribution through utilization of particular donor types (e.g., bis(perhydroisoquinolino)dimethoxysilane (BPIQ)). Other, more recent studies have focused on the use of fluoroalkylsilane compounds (e.g., 3,3,3-trifluoro-propylmethyldimethoxysilane ("E" donor)) that potentially allow for a controlled lower polymer stereoregularity and slightly lower polymer melting temperature, thereby potentially improving resin processability during film production. Indeed, these various catalyst system approaches to the modification of polymer properties for potential enhancement of film grade characteristics have shown varying degrees of promise.

It would be particularly advantageous to discover additional useful external donors and molar ratios of co-catalyst to external electron donor in order to obtain desirable processing characteristics and obtain the desirable amount of xylene solubles in polypropylene.

SUMMARY OF THE INVENTION

There is provided, in one form, a catalyst system for the polymerization or copolymerization of propylene monomer having a Ziegler-Natta catalyst, an organoaluminum compound co-catalyst, and at least one external electron donor comprising di-sec-butyidimethoxysilane (DSBDMS).

In another embodiment of the invention, there is provided a process for the polymerization or copolymerization of propylene monomer that involves providing a Ziegler-Natta catalyst, contacting the catalyst with an organoaluminum compound, contacting the catalyst with at least one electron donor comprising di-sec-butyidimethoxysilane (DSBDMS) simultaneously with or subsequent to contacting the catalyst with an organoaluminum compound, introducing the catalyst into a polymerization reaction zone containing the organoaluminum compound, the electron donor and propylene monomer, and optionally a chain length modifier (or chain transfer reagent) such as hydrogen; and removing polypropylene homopolymer or copolymer from the polymerization reaction zone.

In yet another embodiment of the invention, there is provided polypropylene that encompasses a propylene polymer or copolymer having a melt flow (MF) of between about 1–100 decigrams/min. and xylene solubles of not more than about 6 weight %, and polydispersity (MWD) ranging from about 7 to about 11. In still another embodiment of the invention, the invention concerns articles made from the polypropylene of this invention.

DETAILED DESCRIPTION OF THE INVENTION

It has been surprisingly discovered that a particular silane donor molecule, di-sec-butyldimethoxysilane, DSBDMS, ($^S$Bu)$_2$Si(OMe)$_2$, gives particular advantage in the polymerization of propylene as part of a Ziegler-Natta type catalyst system. The DSBDMS was then utilized as the external donor of a 4$^{th}$-generation Ziegler-Natta catalyst system to polymerize propylene. With respect to a standard external donor used, CMDS, it was found that DSBDMS effects high activity, high bulk density, moderate hydrogen response, moderate donor response, and high MWD. Since a broad MWD polypropylene shows advantages in processing due to higher throughput and finds use in BOPP film applications, DSBDMS has particular promise as a useful external electron donor. Additionally, the silane donor molecule, di-sec-butyldiethoxysilane, DSBDES, ($^S$Bu)$_2$Si(OEt)$_2$, displays advantageous character when used as part of an alpha-olefin polymerization system. Furthermore, mixtures of DSBDMS and DSBDES, and by simple extension to ($^S$Bu)$_2$Si(OEt)(OMe), can be utilized to obtain advantageous character when used as part of an alpha-olefin polymerization system.

In one particular non-limiting embodiment of the invention, the silane donors of this invention can be described by the formula ($^S$Bu)$_2$Si(OR")$_2$, where R" is independently a straight or branched alkyl group of 1–5 carbon atoms. Other specific examples of silane donors within the method of this invention include ($^S$Bu)$_2$Si(OEt)$_2$ and ($^S$Bu)$_2$Si(OEt)(OMe), where Me and Et refer to methyl and ethyl, respectively, of course. In an alternate non-limiting embodiment of the invention, R" is methyl and/or ethyl.

The Ziegler-Natta catalysts useful in the present invention include those derived from a halide of a transition metal, such as titanium, chromium or vanadium, with titanium being an advantageous metal in many embodiments. Examples of transition metal compounds include, but are not necessarily limited to, TiCl$_4$, TiBr$_4$, TiO(C$_2$H$_5$)$_3$Cl, Ti(OC$_2$H$_5$)$_3$Cl, Ti(OC$_3$H$_7$)$_2$Cl$_2$, TiO(C$_6$H$_{13}$)$_2$, Ti(OC$_2$H$_5$)$_2$Br$_2$ and Ti(OC$_{12}$H$_{25}$)Cl$_3$. The transition metal compounds may be used individually or in combination. Typical titanium levels are from about 1.0% to about 5.0% by weight of catalyst, in one non-limiting embodiment of the invention. The Ziegler-Natta catalyst may be a transition metal compound of the formula MR$_x$ where M is selected from the group consisting of titanium, chromium, and vanadium, R is selected from the group consisting of halogen or a hydrocarboxyl, and x is an integer up to and including the maximum valence of M as dictated by its position in the Periodic Table.

The transition metal halide is used in combination with a metal hydride and/or metal alkyl, typically an organoaluminum compound as a co-catalyst. Desirably the co-catalyst is an aluminum alkyl having the formula AlR$_3$, where R is an alkyl group having 1 to 8 carbon atoms, with R being the same or different. Examples of suitable aluminum alkyls include, but are not necessarily limited to, trimethyl aluminum (TMA), triethyl aluminum (TEAL) and triisobutyl aluminum (TIBAL). In one non-limiting embodiment of the invention, the desired aluminum alkyl is TEAL.

In one non-limiting theory about the mechanism by which the invention herein functions, the external donor operates by countering the loss of internal donor in the catalyst system. The nature of the internal donor is not particularly critical to the catalyst and its method of use in this invention, as long as the goals and objectives of the invention with respect to the polypropylene product are met. Suitable internal donors include, but are not necessarily limited to, diethers, aromatic diesters such as alkyl phthalate donors (e.g. diethyl phthalate, di-isobutyl phthalate), amines, amides, ketones, nitriles, phosphines, thioethers, thioesters, aldehydes, alcoholates, salts of organic acids, succinates, malonates, oxalates, glutarates and combinations thereof. One useful group of internal donors includes, but is not necessarily limited to, esters of phthalic acid such as di-isobutyl, dioctyl, diphenyl, di-n-butyl, di-2-ethylhexyl, and benzylbutyl, and the like, and combinations thereof.

These internal electron donors are added during the preparation of the catalysts and may be combined with the support or otherwise complexed with the transition metal halide.

The Ziegler-Natta catalyst is typically a supported catalyst. Suitable support materials include magnesium compounds, such as magnesium halides, dialkoxymagnesiums, alkoxymagnesium halides, magnesium oxyhalides, dialkylmagnesiums, magnesium oxide, magnesium hydroxide, and carboxylates of magnesium. Typical magnesium levels are from about 10% to about 25% by weight of catalyst.

In the subject invention, the Ziegler-Natta catalyst must be used with at least one external donor compound, such as a Lewis base. More specifically, external donors are typically organosilicon compounds. External electron donors may be those described by the formula $SiR_m(OR')_{4-m}$, where R is an alkyl group, a cycloalkyl group, an aryl group or a vinyl group, R' is an alkyl group, m is 0–4, each R' may be the same or different, and each R may be the same or different. In particular, the external electron donor acts as a stereoregulator and to control the amount of atactic form of polymer produced, which results in a decrease in xylene solubles. That is, external electron donors can both affect the isotacticity of a polymer chain produced by a specific active site and inhibit or "shut down" atactic active sites. Representative examples of external donors include cyclohexylmethyldimethoxysilane (CMDS), dicyclopentyldimethoxysilane (CPDS), diisopropyldimethoxysilane (DIDS), cyclohexylisopropyldimethoxysilane (CIDS), di-t-butyldimethoxysilane (DTDS), (3,3,3-trifluoropropyl)methyldimethoxysilane ("E" donor), and combinations thereof. However, in the subject invention, at least one of the electron donors that should be used is di-sec-butyldimethoxysilane (DSBDMS). As discussed, DSBDMS has been discovered to be used with Ziegler-Natta catalysts to provide high catalyst activity, high bulk density, moderate hydrogen response, moderate donor response, and high MWD (polydispersity), and hence improved processing due to higher throughput, particularly for BOPP film. It is within the scope of this invention to use DSBDMS in conjunction with one or more other external donors including, but not necessarily limited to, CMDS, CPDS, DIDS, CIDS, DTDS and/or "E" donor. In some cases it will be found that there is a synergistic effect between the internal donor and the external donor. That is, results will be obtained with a particular combination of internal donor and external donor that cannot be achieved with one or the other individually.

Unless specified otherwise, amounts of external donor are presented herein as parts per million (ppm) based on the weight of monomer. In one nonlimiting embodiment of the invention, the amount of DSBDMS ranges from about 0.5 to about 500 ppm, alternatively from about 0.5 to about 200 ppm, and in another non-limiting embodiment from about 0.5 to about 20 ppm. Desirably, any second or subsequent external donor is used in the range of from about zero to about 200 ppm, and in another non-limiting embodiment from about 0 to about 100 ppm. The Al/Si molar ratio (organoaluminum compound to silane donor) may range from about 0.5 to about 500, and in another non-limiting embodiment from about 0.5 to about 100 ppm, and in another non-limiting embodiment from about 0.5 to about 20 ppm.

As is well known, polypropylene may be produced by slurry polymerization in the presence of a solvent, e.g. hexane, such as in a loop or CSTR reactor, or by bulk polymerization in which propylene serves as both monomer and diluent, which is typically carried out in a loop-type reactor. Also, polypropylene may be produced by gas phase polymerization of propylene, which is typically carried out in a fluidized bed reactor under lower pressures than bulk polymerization. In a typical bulk process, one or more loop reactors operating generally from about 50 to about 100° C. (in another non-limiting embodiment from about 60 to about 80° C.), with pressures of from about 300 to 700 psi (2.1 to 4.8 MPa) (from about 450 to about 650 psi in another non-limiting embodiment) (3.1 to 4.5 MPa), may be used to polymerize propylene. The various catalytic components, i.e., Ziegler-Natta catalyst, cocatalyst, external donor, are introduced into the reactor, as well as a molecular weight controlling agent (if any, e.g., hydrogen), and the resulting polypropylene fluff or powder is continuously removed from the reactor. The fluff may then be subjected to extrusion to produce desired pellets. Suitable molecular weight modifiers include, but are not necessarily limited to, hydrogen.

In the study of this invention, a conventional titanium supported on an active magnesium dihalide Ziegler-Natta catalyst was used in the presence of a number of external silane donors to assess effects on polymerization performance and polymer properties.

For bulk polymerization utilizing the DSBDMS external donor-containing catalyst, the reactor temperatures are usually kept from about 50 to about 100° C., more particularly from about 60° C. to about 80° C. in one non-limiting embodiment. It should be noted that increasing the temperature (within limits) will typically result in an increased catalytic activity and lower xylene solubles. Hydrogen concentrations may vary, but are usually kept at from about 0.02 mol % to about 1.1 mol %, in one non-limiting embodiment from about 0.04 mol % to about 0.5 mol % based on monomer, and depending on the resin melt flow desired.

The polymers produced in accordance with the present invention are those having a melt flow after polymerization of at least 1 decigram/min or greater, as measured according to ASTM D1238-95. Typical melt flows useful for preparation of BOPP film are from about 1 to about 100 decigram/min, with from about 1 to about 16 decigram/min being readily obtainable, under the stated conditions while still retaining low xylene solubles. Thus, the polymers of this invention are expected to be suitable for film grade resins as well as for injection molding applications, and the like. The polymers produced are also characterized as having low xylene solubles of not more than about 6 weight %, from about 0.5 to about 6 wt % in an alternate, non-limiting embodiment of the invention, with from about 1 to about 5% being readily obtainable, and from 1 to about 4% being more readily obtainable, without any detrimental effects on melt flow.

Additionally, the polypropylene homopolymer or copolymer may have a meson pentad level of between about 95 to about 98 wt. % as measured via $^{13}$C NMR on the insoluble (i.e., crystalline) fraction. While this isotacticity gained from use of DSBDMS, is not necessarily ideal for BOPP film, these levels are closer to what is commonly called high crystallinity polypropylene, HCPP. The resin obtained from use of DSBDMS may have attributes advantageous for use in some cases of BOPP and some cases of HCPP. The polydispersity (Mw/Mn) of the polypropylene homopolymer or copolymer, as measured via Size Exclusion Chromatography, may range from about 7 to about 11, in another non-limiting embodiment from about 9 to about 11.

As used herein, the terms "propylene polymer" or "polypropylene," unless specified otherwise, shall mean propylene homopolymers or those polymers composed primarily of propylene and limited amounts of other comonomers, such as ethylene, wherein the comonomers make up less than 0.5% by weight of polymer, and more typically less than 0.1% by weight of polymer. However, in some cases, minirandom copolymers with even small amounts of ethylene are desired. The catalyst components of this invention provide another way of adjusting the microtacticity of the polypropylene and thus improving the properties of film grade polypropylene.

The following examples serve to illustrate the present invention, but are not intended to limit the invention in any way.

The polymerization experiments were performed with Toho THC A (a conventional 4$^{th}$-generation titanium containing propylene polymerization catalyst available from Toho Catalyst Co., Ltd.) under standard conditions: 1 hr polymerization, 70° C., in situ prepolymerization.

($^S$Bu)$_2$Si(OMe)$_2$ preparation: A round bottom flask was charged with Si(OMe)$_4$ (100 mmol) and hexane (30 mL) and cooled to 0° C. Over seven hours, $^S$BuMgCl (60 mmol, 2.0 M in Et$_2$O) was added drop-wise. The mixture was then stirred at ambient temperature overnight and subsequently purified by thermal distillation.

($^S$Bu)$_2$Si(OEt)$_2$ preparation: A round bottom flask was charged with SiCl$_4$ (47 mmol) and hexane (50 mL) and cooled to 0° C. Over four hours, $^S$BuMgCl (99 mmol, 2.0 M in Et$_2$O) was added dropwise. The mixture was then stirred at ambient temperature for 30 minutes and then cooled to 0° C. A mixture of ethanol (114 mmol) and pyridine (101 mmol) was added and the mixture was allowed to warm to ambient temperature and subsequently purified by thermal distillation.

The donor DSBDMS, when compared to diisopropyl dimethoxysilane (DIDS), generally imparts higher XS, MF, and MWD. The diethoxy homolog of DSBDMS, DSBDES, imparts desirable polymer properties as well with very high MF, rather high XS, and moderate MWD. Furthermore, mixtures of DSBDMS and DSBDES impart polymer properties with some synergism seen with XS, activity, and MWD.

The general experimental conditions and reagents for the catalyst evaluations are shown in Table I. The comparative resins produced have the characteristics and properties shown in Table II.

TABLE I

Experimental Conditions for Catalyst Evaluations

| Reagents: | |
|---|---|
| Catalyst: | 10 mg |
| TEAL: | 1.0 mmol |
| Ext. Donor: | 0.10 or 0.02 mmol |
| Conditions: | |
| Temp.: | 70° C. |
| Time: | 1 hour |
| Propylene: | 1.4 L (0.74 kg) |
| Prepolymerization: | in situ |

TABLE II

Polymerization Data and Comparisons

| Ex. | Donor | Al/Si | H$_2$ (mol %) | XS (wt %) | MF (dg/min) | MWD (Mw/Mn) | Activity (g/g/h) | mmmm (mol %) | BD (g/cm$^3$) |
|---|---|---|---|---|---|---|---|---|---|
| 1 | CMDS | 10 | 0.08 | 1.16 | 1.7 | 6.7 | 33,200 | | 0.48 |
| 2 | CMDS | 10 | 0.40 | 1.44 | 10.0 | — | 36,200 | | 0.49 |
| 3 | CMDS | 50 | 0.08 | 3.12 | 3.0 | — | 36,600 | | 0.45 |
| 4 | CMDS | 50 | 0.40 | 4.70 | 24.0 | 6.7 | 46,000 | 96.1 | 0.45 |
| 9 | DIBDS | 10 | 0.09 | 1.56 | 2.9 | 8.2 | 32,600 | | 0.47 |
| 10 | DIBDS | 20 | 0.43 | 2.04 | 11.8 | 9.0 | 45,000 | | 0.49 |
| 11 | DIBDS | 50 | 0.09 | 3.04 | 4.2 | 9.1 | 40,500 | 95.7 | 0.47 |
| 12 | DIBDS | 50 | 0.43 | 2.48 | 22.7 | 8.1 | 44,200 | | 0.47 |
| 13 | CPDS | 10 | 0.08 | 1.0 | 0.5 | 9.1 | 34,800 | | 0.49 |
| 14 | CPDS | 10 | 0.40 | 1.24 | 4.5 | — | 46,800 | | 0.49 |
| 15 | CPDS | 50 | 0.08 | 1.4 | 0.7 | — | 34,800 | | 0.49 |
| 16 | CPDS | 50 | 0.40 | 1.6 | 4.2 | 7.8 | 45,800 | 97.6 | 0.49 |
| 17 | DIDS | 10 | 0.09 | 1 | 1.20 | 7.3 | 38,000 | | 0.49 |
| 18 | DIDS | 10 | 0.43 | 1.2 | 8.60 | 8.2 | 43,300 | | 0.48 |
| 19 | DIDS | 50 | 0.09 | 1.04 | 1.0 | 8.3 | 38,800 | 97.1 | 0.50 |
| 20 | DIDS | 50 | 0.43 | 1.52 | 7.3 | 9.8 | 46,000 | | 0.49 |
| 21 | DSBDMS | 10 | 0.09 | 1.6 | 1.5 | 9.5 | 31,000 | | 0.48 |
| 22 | DSBDMS | 10 | 0.43 | 1.7 | 15.5 | 8.4 | 39,200 | | 0.49 |
| 23 | DSBDMS | 50 | 0.09 | 1.4 | 1.8 | 9.1 | 34,500 | 95.6 | 0.49 |
| 24 | DSBDMS | 50 | 0.43 | 2.2 | 13.0 | 9.4 | 44,000 | | 0.48 |
| 25 | DSBDES | 10 | 0.09 | 11.46 | 15.1 | 7.7 | 31,800 | | 0.40 |

TABLE II-continued

Polymerization Data and Comparisons

| Ex. | Donor | Al/Si | H$_2$ (mol %) | XS (wt %) | MF (dg/min) | MWD (Mw/Mn) | Activity (g/g/h) | mmmm (mol %) | BD (g/cm$^3$) |
|---|---|---|---|---|---|---|---|---|---|
| 26 | DSBDES | 10 | 0.43 | 10.0 | 93.0 | 6.5 | 40,200 | | 0.41 |
| 27 | DSBDES | 50 | 0.09 | 16.4 | 22.0 | 6.1 | 32,300 | | 0.34 |
| 28 | DSBDES | 50 | 0.43 | 13.7 | 140.0 | 6.7 | 40,500 | 94.3 | 0.38 |
| 29 | 1:1 DSBDMS:DSBDES | 10 | 0.43 | 1.92 | 17 | 8.7 | 41,300 | | 0.48 |

Figure 1:
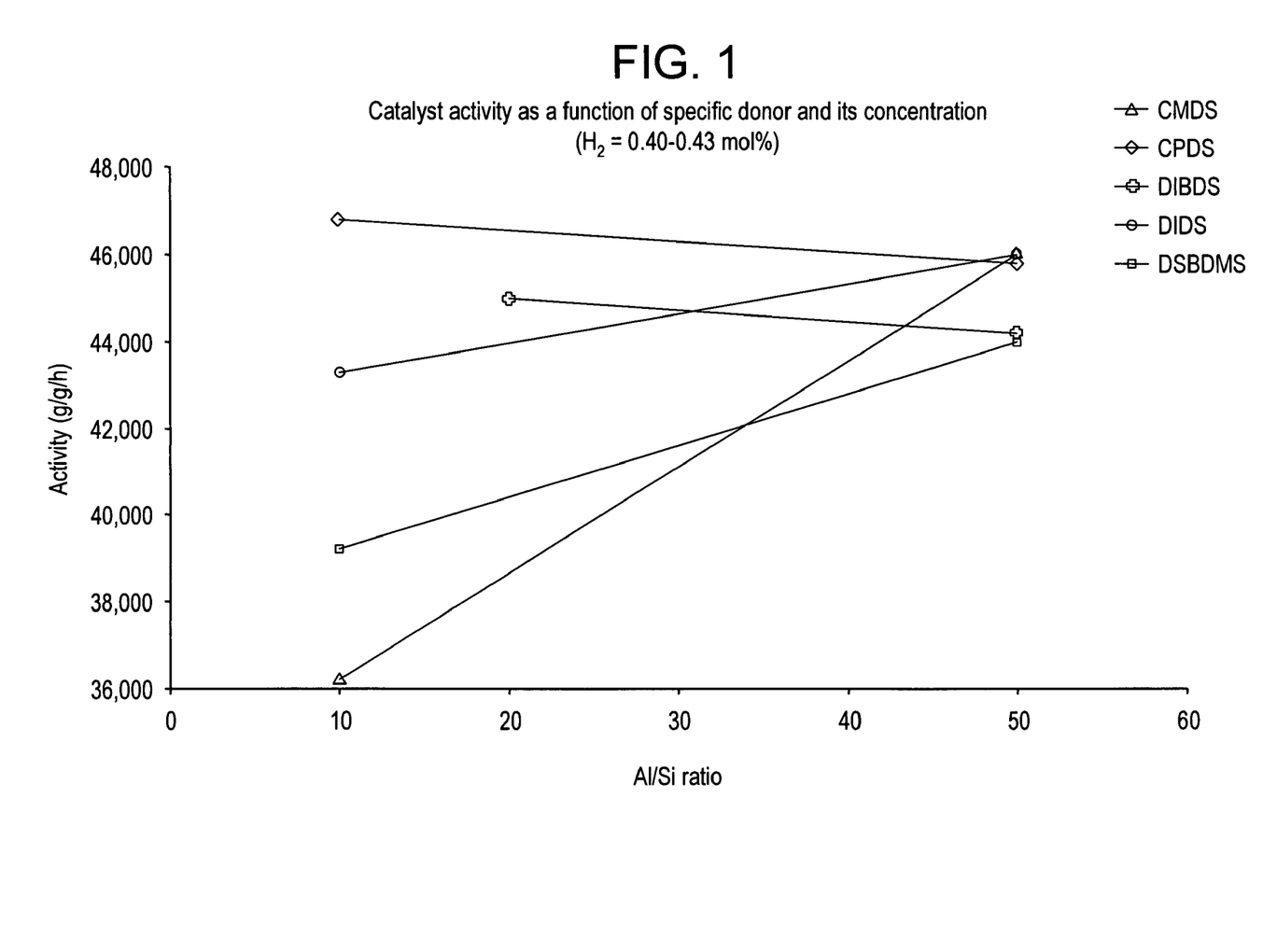
FIG. 1 is a graph of catalyst activity as a function of specific donor and its concentration where hydrogen concentration was 0.40–0.43 mol %.
Figure 2:
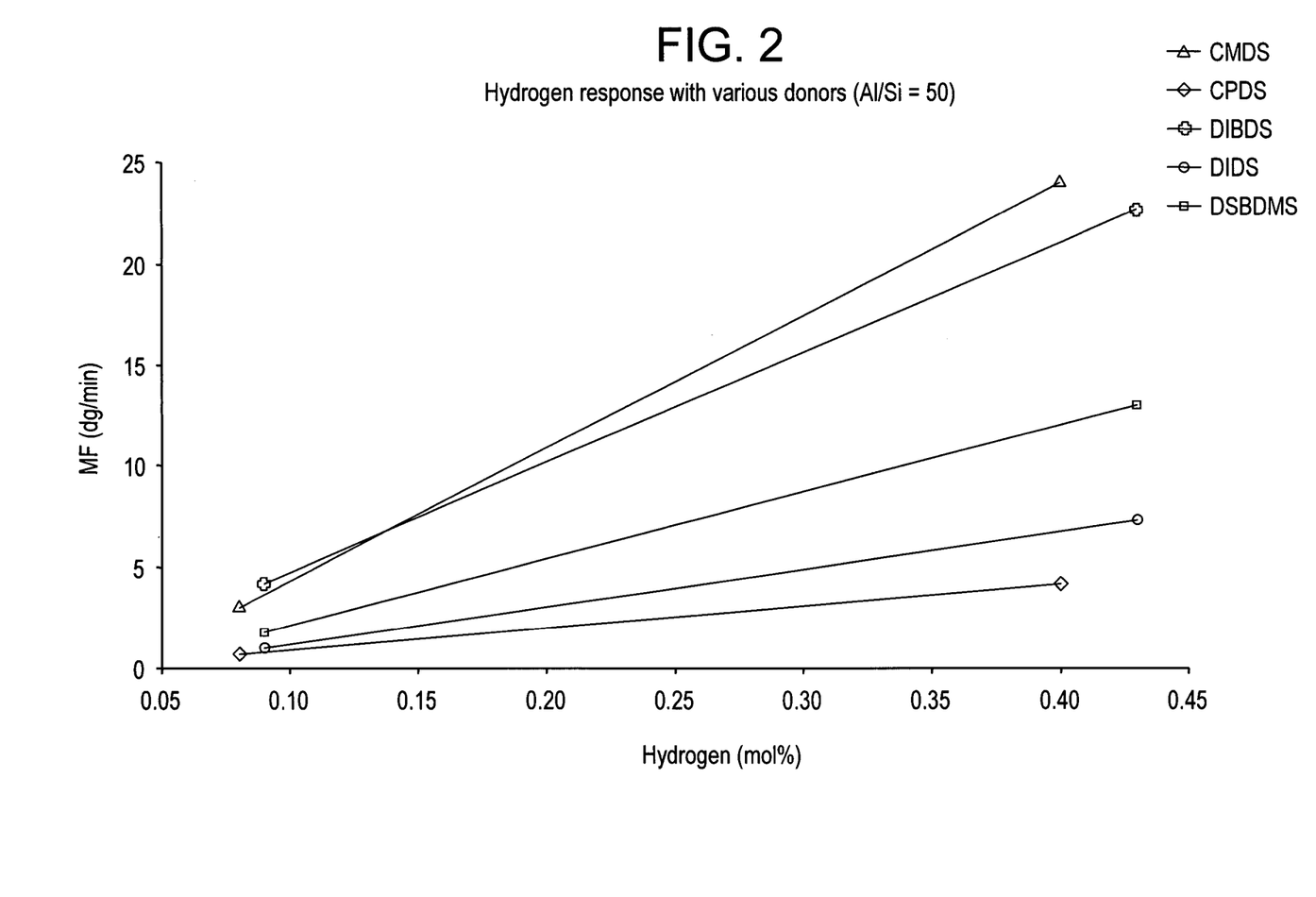
FIG. 2 is a graph of hydrogen response (melt flow as a function of mol % hydrogen) using various external electron donors at an Al/Si ratio of 50.
Figure 3:
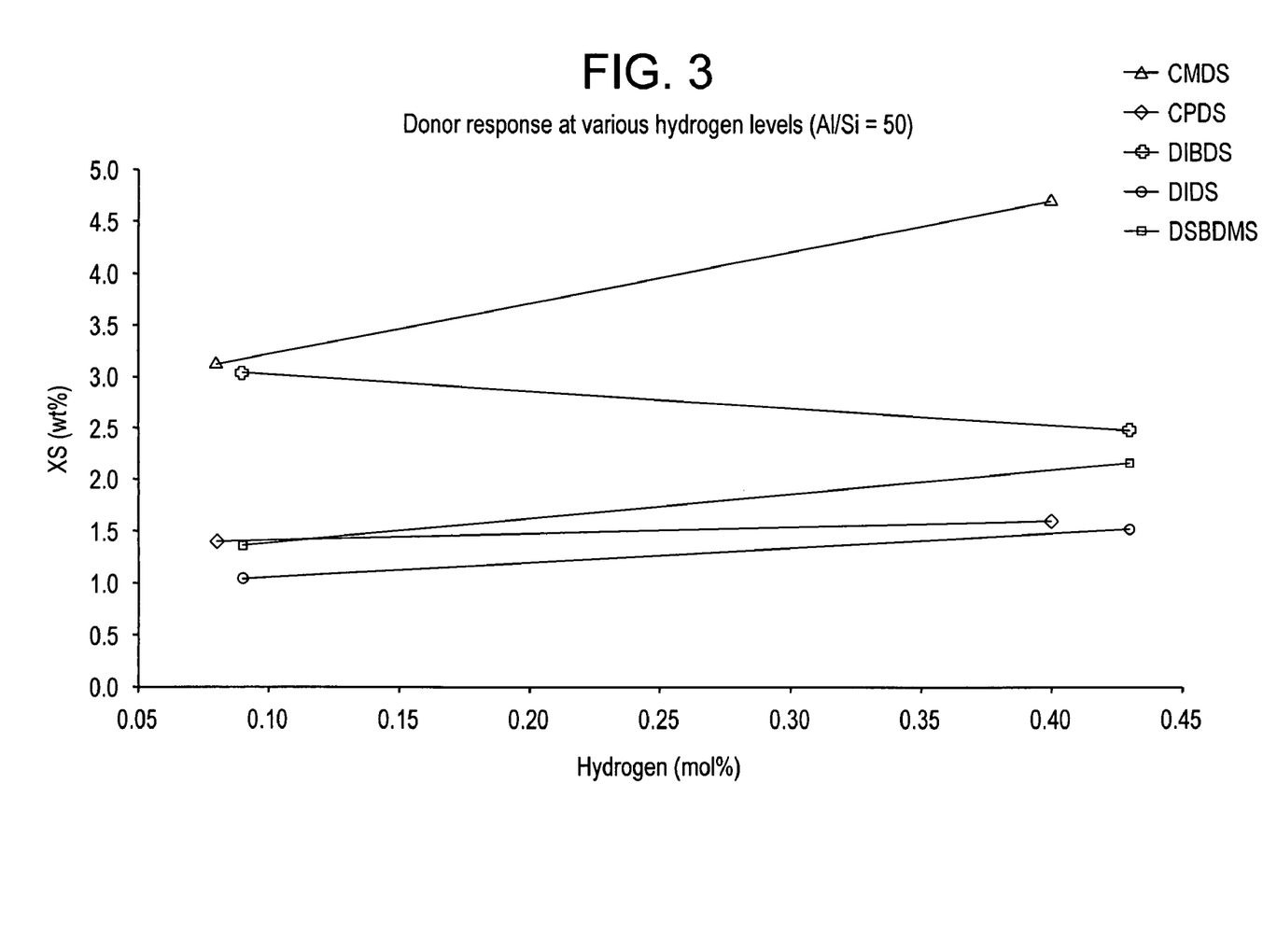
FIG. 3 is a graph of donor response at various hydrogen levels for various electron donors where Al/Si=50.
Figure 4:
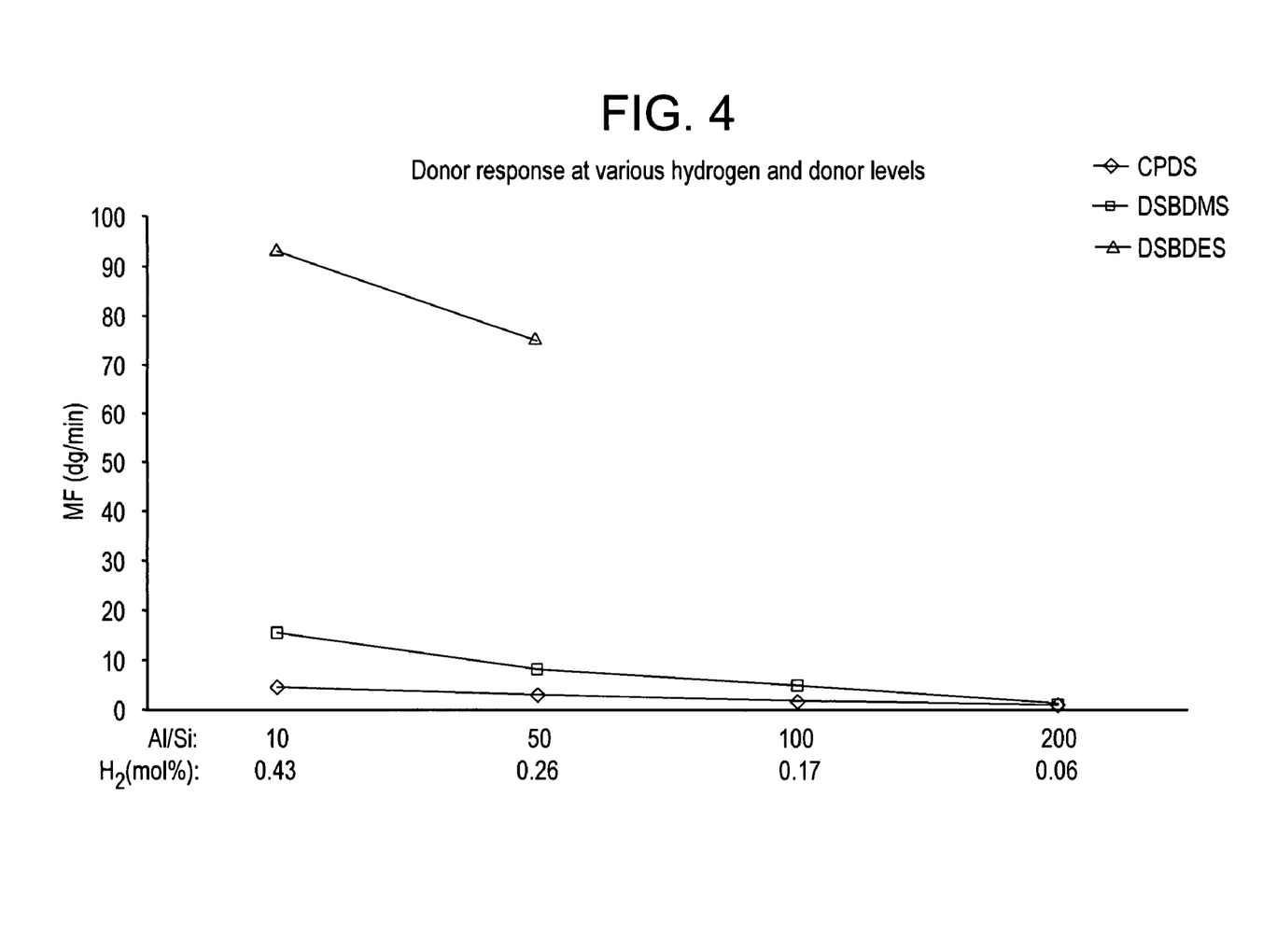
FIG. 4 is a graph of donor response for three electron donors at various hydrogen and donor levels.

FIG. 1 is a graph of catalyst activity as a function of Al/Si ratio at 10 and 50 for five of the donors, where the hydrogen concentration was from about 0.40 out 0.43 mol. %. FIG. 2 is a graph of hydrogen response (melt flow as a function of mol % hydrogen) using various external electron donors at an Al/Si ratio of 50. FIG. 3 is a graph of donor response at various hydrogen levels for a variety of electron donors expressed as xylene solubles in wt. % as a function of mol % hydrogen present, where the Al/Si ratio was 50. FIG. 4 is a graph of donor response at various hydrogen and donor levels expressed as melt flow in dg/min for CPDS, DSB-DMS and DSBDES electron donors.

It is of interest to note that the activity of DSBDMS is only about 5% lower than that of the conventional CMDS. It may be seen that DSBDMS provides relatively high catalyst activity, relatively high bulk density (BD), relatively high polydispersity, while also yielding relatively moderate hydrogen response and moderate donor response.

In the foregoing specification, the invention has been described with reference to specific embodiments thereof, and has been demonstrated as effective in providing a Ziegler-Natta catalyst system for the polymerization and copolymerization of propylene monomer. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations or amounts of catalysts, co-catalysts, internal donors, and external donors, and other components and proportions thereof falling within the claimed parameters, but not specifically identified or tried in a particular catalyst system, are anticipated and expected to be within the scope of this invention. Further, the method of the invention is expected to work at other conditions, particularly temperature, pressure and concentration conditions, than those exemplified herein.

I claim:

1. A process for the polymerization of propylene monomer, comprising:
   providing a Ziegler-Natta, and in any order catalyst;
   contacting the catalyst with an organoaluminum compound;
   contacting the catalyst with at least one electron donor comprising a di-sec-butyldialkoxysilane, where the di-sec-butyldialkoxysilane has the formula ($^S$Bu)$_2$Si(OR")$_2$, where R" is independently a straight or branched alkyl group of 1–5 carbon atoms;
   introducing the catalyst into a polymerization reaction zone containing the organoaluminum compound, the electron donor, propylene monomer and optionally, an olefin monomer other than propylene monomer; and
   removing polypropylene homopolymer or copolymer from the polymerization reaction zone.

2. The process of claim 1 where the Ziegler-Natta catalyst comprises a transition metal compound of the formula MR$_x$ where M is selected from the group consisting of titanium, chromium, and vanadium, R is selected from the group consisting of halogen or a hydrocarboxyl, and x is an integer up to and including the maximum valence of M as dictated by its position bathe Periodic Table.

3. The process of claim 1 where the polypropylene homopolymer or copolymer removed from the polymerization reaction zone has xylene solubles ranging from about 0.5 to about 6 wt %.

4. The process of claim 1 where the polypropylene homopolymer or copolymer removed from the polymerization reaction zone has a polydispersity ranging from about 7 to about 11.

5. The process of claim 1 where the organoaluminum compound is an aluminum trialkyl co-catalyst of the formula AlR$_3$, where R is an alkyl group having 1 to 8 carbon atoms, with each R being the same or different.

6. The process of claim 5 where the organoaluminum co-catalyst is triethyl aluminum (TEAL).

7. The process of claim 1 where the Al/Si molar ratio (organoaluminum compound to silane donor) ranges from about 0.5 to about 500.

8. The process of claim 1 where the electron donor is present in an amount of from about 0.5 to about 500 ppm by weight of propylene monomer.

9. The process of claim 1 where the polymerization reaction zone contains the olefin monomer other than propylene monomer.

10. The process of claim 1 further comprising contacting the catalyst with at least one molecular weight modifier.

11. The process of claim 1 where the electron donor is selected from the group consisting of di-sec-butyldimethoxysilane (DSBDMS), di-sec-butyldiethoxysilane (DSBDES), di-sec-butylmethoxyethoxysilane, and mixtures thereof.

12. A process for the polymerization or copolymerization of propylene monomer, comprising:
   providing a Ziegler-Natta catalyst, where the Ziegler-Natta catalyst comprises a transition metal compound of the formula MR$_x$ where M is selected from the group consisting of titanium, chromium, and vanadium, R is selected from the group consisting of a halogen and a hydrocarboxyl, and x is an integer up to and including the maximum valence of M as dictated by its position in the Periodic Table, and in any order;
   contacting the catalyst with an organoaluminum compound,
   contacting the catalyst with at least one electron donor selected from the group consisting of di-sec-butyldimethoxysilane (DSBDMS), di-sec-butyldiethoxysilane (DSBDES), di-sec-butylmethoxyethoxysilane, and mixtures thereof;

contacting the catalyst with at least one molecular weight modifier;

introducing the catalyst into a polymerization reaction zone containing the organoaluminum compound, the electron donor, the molecular weight modifier, propylene monomer and; and removing polypropylene homopolymer or copolymer from the polymerization reaction zone where the Al/Si molar ratio (organoaluminum compound to silane donor) ranges from about 0.5 to about 500.

13. The process of claim 12 where the polypropylene homopolymer or copolymer removed from the polymerization reaction zone has xylene solubles ranging from about 0.5 to about 6 wt %.

14. The process of claim 12 where the polypropylene homopolymer or copolymer removed from the polymerization reaction zone has a polydispersity ranging from about 7 to about 11.

15. The process of claim 12 where the organoaluminum compound is an aluminum trialkyl co-catalyst of the formula $AlR_3$, where R is an alkyl group having 1 to 8 carbon atoms, with each R being the same or different.

16. The process of claim 15 where the organoaluminum co-catalyst is triethyl aluminum (TEAL).

17. The process of claim 12 where the electron donor is present in an amount of from about 0.5 to about 500 ppm by weight of propylene monomer.

* * * * *